March 10, 1953  W. C. EDDY  2,631,035
COMPRESSION TYPE ENDLESS FILM REEL
Filed Dec. 14, 1949  2 SHEETS—SHEET 1
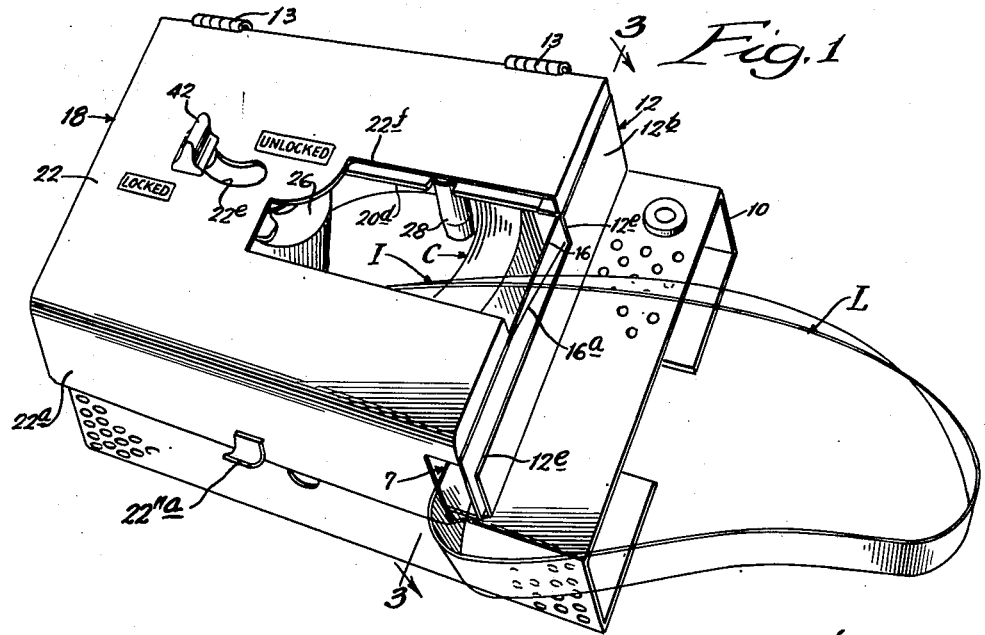
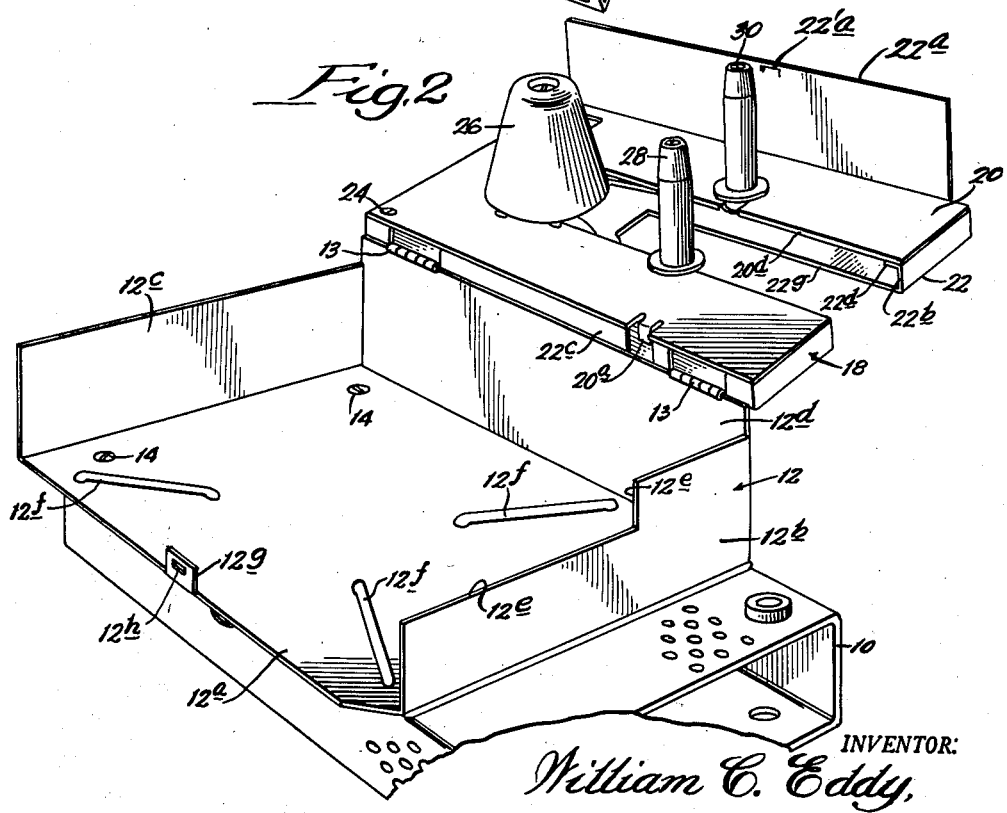
INVENTOR:
William C. Eddy,
BY Dawson, Ooms, Booth and Spangenberg,
ATTORNEYS.

March 10, 1953 W. C. EDDY 2,631,035
COMPRESSION TYPE ENDLESS FILM REEL
Filed Dec. 14, 1949 2 SHEETS—SHEET 2
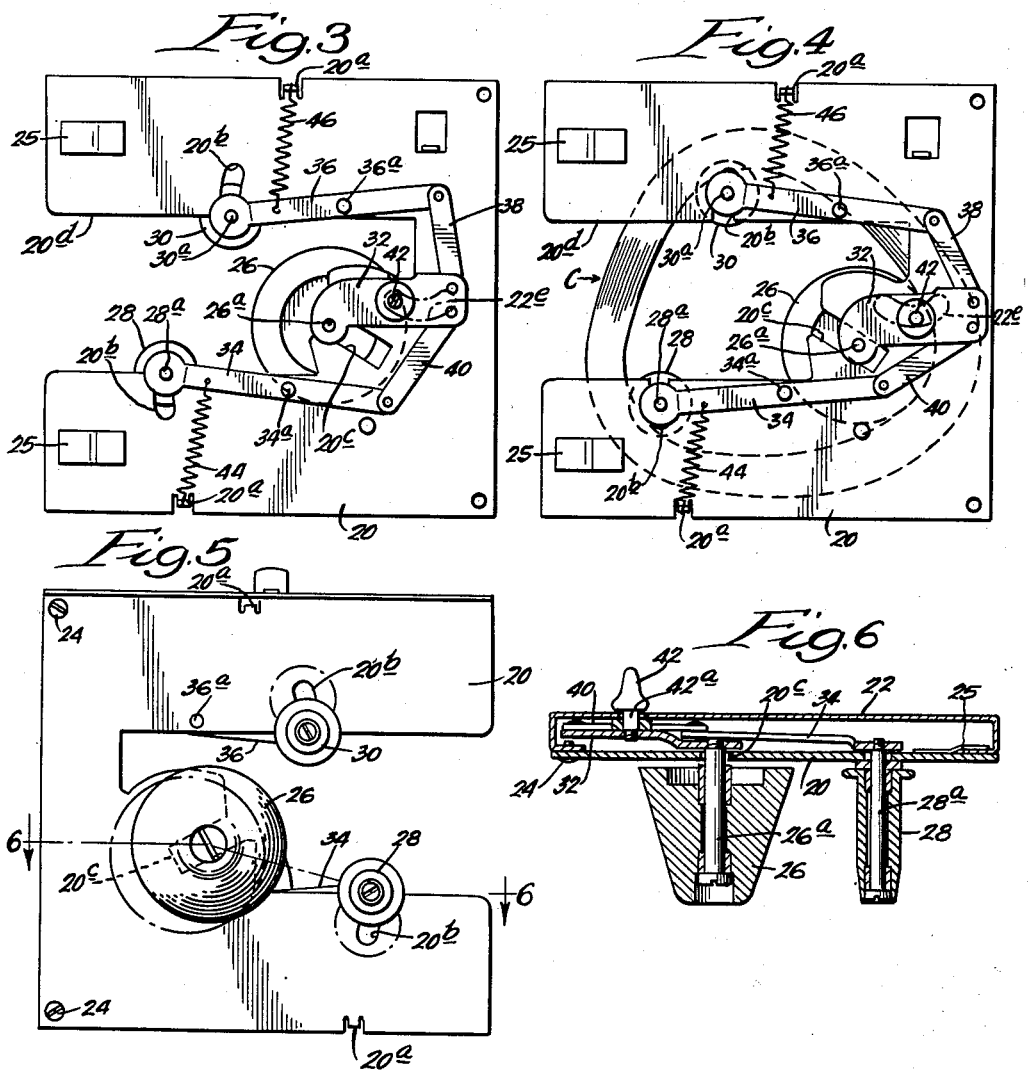
INVENTOR:
William C. Eddy,
BY Dawson, Cone, Broth and Hangenberg,
ATTORNEYS.

Patented Mar. 10, 1953

2,631,035

UNITED STATES PATENT OFFICE 2,631,035

COMPRESSION TYPE ENDLESS FILM REEL

William C. Eddy, Michigan City, Ind., assignor to Television Associates, Inc., Michigan City, Ind., a corporation of Illinois Application December 14, 1949, Serial No. 132,896

3 Claims. (Cl. 271—2.18)

My invention relates to an improved endless film reel characterized by the ease with which film coils may be inserted and removed.

Endless film coils provide an advantage over other methods of handling film in that the film is wound on the coil as fast as it is taken therefrom. This avoids the necessity of rewinding equipment, the delay incident to the rewinding, and the necessity of manual operation of the unit for rewinding. Moreover, in the case of magnetic or mechanical recorders and reproducers it is possible to use a Mobius loop in the endless film to define a single continuous surface of length and area equal to the total of both sides of the film.

While the foregoing advantages of the endless film coil have been long recognized, the disadvantages of this arrangement have been such that it has received limited commercial use. Outstanding among these disadvantages has been the inability of available equipment to accommodate changes of film without expert manipulation or the use of duplicate film guide mechanisms. This difficulty is rendered particularly acute by the fact that an endless film coil, when released, forms a hopeless entanglement requiring difficult and time consuming manipulation to restore it to the original coiled condition.

In my copending patent application S. N. 132,895, filed December 14, 1949, entitled Endless Coil Magazine and Container, I have described and claimed a convenient inexpensive cardboard endless film container that permits storage and shipment of endless film coils in condition for immediate use without chance of uncoiling and without the use of a complete film guiding structure. The apparatus of the present invention is a structure particularly suitable for use with the magazine defined by the film container and the film coil therein.

One difficulty associated with endless film coils arises out of the gripping action of the coil on the guiding rollers which makes difficult the removal of the coil without sliding one or more of the inner turns out of the coil. This cannot be avoided by loosening the film coil before use because the film tightens when used. Moreover, even after the coil is loosened sufficiently to come off the guiding rollers, it is usually too tight to fit over the rollers easily when replaced and further loosening is required. In the apparatus of the present invention, elements are provided to release the film and thereby avoid the manipulations heretofore required to insert and remove the coil.

In the apparatus of the present invention the film reel is defined by separable parts, the bottom part defining a film support and the top part carrying depending retractible film guiding rollers. When the parts are in the mated condition, they define a film reel with a film release aperture from which the film is unwound and a film take-up aperture through which film is drawn by rotations of the coil. The top part carries depending rollers that engage the inner periphery of the film coil to guide it while operating. These rollers are mounted for retracting movement to release the inner periphery of the coil for insertion of the coil or its removal from the reel.

It is therefore a general object of the present invention to provide an improved endless film reel adapted to receive or release the film without manipulation.

Another object of the present invention is to provide a closable two part film reel carrying retractible film guiding rollers that may be retracted for insertion and removal of the film coil.

Still another object of the present invention is to provide an endless film reel adapted to receive a film coil magazine with minimum manipulation.

My invention further resides in providing an improved endless film reel characterized by simplicity and ruggedness of construction and ease of insertion and removal of film coils to the end that a device suitable for convenient use with any one of a plurality of endless films is achieved.

The novel features which I believe to be characteristic of my invention are set forth with particularity in the appended claims. My invention itself, however, both as to its organization and mode of operation, together with further objects and advantages thereof, may best be understood by reference to the following description taken in connection with the accompanying drawings, in which:

Figure 1 is a view in perspective showing the reel of the present invention with a film magazine in place;

Figure 2 is a view in perspective of the reel of Figure 1 in the opened position without the film magazine in place;

Figure 3 is a cross-sectional view through the axis 3—3, Figure 1, showing the parts in the retracted or film releasing position;

Figure 4 is a view like Figure 1 but showing the parts in the expanded or film engaging position;

Figure 5 is a fragmentary top plan view of the apparatus in the condition shown in Figure 2 with the elements in the retracted or film releasing position; and, Figure 6 is a cross-sectional view through axis 6—6, Figure 5.

Referring now to Figure 1, there is shown at C an endless film coil having an external loop L. The loop L is formed by the portion of the coil C issuing from its inner periphery, herein designated as the leaving portion of the film, and the portion of the coil C being wound up on the outer periphery, herein designated as the take-up portion of the film. The issuing and take-up portions of the film are indicated at I and T, respectively, Figure 1.

The apparatus of Figure 1 forms an enclosure for the coil C and supports it so that as film is pulled from the inner periphery of the coil by tension on loop L, the coil rotates to wind up film on its outer periphery. The film withdrawing tension is exerted by the operating mechanism of a motion picture camera or projector or a mechanical or magnetic recorder or reproducer (not shown) through which the loop L is threaded when the film is in use.

As shown in Figures 1 and 2, the film receiving apparatus or reel is supported by a channel member 10. The bottom part of the reel, 12, is attached to this member by a plurality of screws 14.

The bottom part 12 is defined by a flat bottom plate 12a, two vertical sides 12b and 12c, and a vertical rear wall 12d. As shown, the side 12b is cut out at 12e to define a rectangular aperture to receive the issuing portion of the film I. This aperture is of sufficient size to receive the film when it is held in the slot 16a of the film container 16 as is described in further detail hereafter.

The rear wall 12d of the part 12 extends somewhat above the top edges of sides 12b and 12c. The upper edge of the rear wall carries one leaf of each hinge 13. The hinges support the top part 18.

The partial enclosure defined by part 12 is of size to receive snugly the film container 16. Briefly, this container is a rectilinear box of size to receive the film coil C and has cut out portions to receive the issuing portion of the film, I, and the take-up portion, T. The construction of the container is described and claimed in my copending patent application S. N. 132,895, filed December 14, 1949, entitled Endless Coil Magazine and Container.

The bottom of the container 16 has a series of three elongated slots (not shown). These fit over the three upstanding ribs 12f, Figure 2, formed in the bottom 12a of the part 12. These ribs are smoothly polished to define a low friction support for the coil C to permit relatively frictionless rotation thereof.

The other part of the reel is indicated generally at 18. It is held to the bottom part 12 by the hinges 13 which permit relative movement relative to part 12 to accommodate insertion of the film coil C while it is carried by the container 16. As shown, the top part 18 is defined by two spaced plates, 20 and 22, which define an intermediate space in which the operating elements, described hereafter, are located.

The upper or outer plate 22 extends downwardly along its front edge in a skirt 22a. This skirt extends over the open side of the bottom member 12 to define a complete closure in conjunction therewith. The bottom 12 has an upturned tab 12g with an opening 12h that receives the dimple 22a' of the skirt 22a to secure the top 18 in releasable closed position. A handle 22a'' facilitates closure of the top 18.

The side edges 22b and the rear edge 22c of the member 22 are bent to define a complete skirt in conjunction with the side 22a. In addition, these parts are bent over as at 22d to define a channel shaped section. The lower plate 20 is secured to the plate 22 by the screws 24, Figure 2, and by the leaf members 25, Figures 3 and 6, which are welded or otherwise attached to plate 20 and fit over the channel portion 22d of the plate 22.

The member 20 is a flat plate adapted to mate with and be received upon the top member 22. As is described in further detail hereafter, the member 20 has openings to receive the various parts depending from the plate 22.

A film release roller 26 and a pair of film guide rollers 28 and 30 depend from the cover 18. As seen best in the cross-sectional view of Figure 3, rollers 28 and 30 are carried by the rockable arms 34 and 36, respectively, these arms being pivotally supported on the top plate 22 by pins 34a and 36a, respectively, seen in cross-section in Figure 3. The film release roller 26 is carried by arm 32. Links 38 and 40 extend between arms 36 and 32, and 32 and 34, respectively, and are pivotally attached thereto on the sides opposite the rollers.

As seen best in Figure 6, a handle 42 is attached to arm 32. This handle protrudes through the arcuate slot 22e in plate 22 as shown in Figure 1 and forms a conveniently accessible member for operating the arms 32, 34, and 36. Since the portion 42a of the handle fits in slot 22e with limited clearance, the handle also acts in conjunction with the slot to define the locus of motion of the arm 32.

The movement of the arm 36 is further defined by the shaft 26a from which the roller 26 is supported. This shaft fits in the slot 20c, Figures 3 and 6, with limited clearance. Since the plate 32 must always move about a locus with shaft 26a in the slot 20c and the part 42a in the slot 22e (shown by dotted lines in Figure 3), and, in addition, as required to accommodate the links 38 and 40, the movement of the arm 32 is confined to a predetermined locus. There is, however, substantial lost motion or slack because of the clearance in slots 20c and 22e.

In the position shown in Figure 3, the film release roller 26 and the coil guide rollers 28 and 30 are in the retracted or compressed condition. At this time the handle 42 is adjacent the legend "unlocked" of Figure 1 and is consequently at the right hand end of slot 22e as seen in that figure. The roller 26 is correspondingly positioned towards the center of the cover 18. Moreover, in this condition the links 38 and 40, which rock arms 36 and 34 as required to accommodate the position of arm 32, hold these arms in orientations positioning the rollers 28 and 30 near the center of cover 18.

Figure 4 shows the rollers shifted to the extended film coil engaging positions. In this condition the handle 42 is positioned as shown in Figure 1. This position of the arm 32 differs from the position of Figure 3 primarily in that the arm is shifted to the right as seen in Figure 4 in relation to the position shown in Figure 3. In order to accommodate this shifting motion of the arm 32, the links 38 and 40 straighten relative to the arms 36 and 34 and the arms 36 and 34 rock in directions expanding the rollers 28 and 30 relative to each other as shown.

The arms 34 and 36 are biased to the expanded position relative to each other by the springs 44 and 46, respectively. These springs are anchored to the arms, respectively, and to the hooks 20a formed on the plate 20. In urging the arms 34 and 36 in direction to expand rollers 28 and 30, the springs 44 and 46 urge links 38 and 40 to aligned positions relative to arms 34 and 36 and thereby urge the roller 26 to an expanded position relative to rollers 28 and 30.

While the springs 44 and 46 urge the rollers to fully expanded positions when the handle 42 is moved away from the "unlocked" position of Figure 1, they do not move the rollers when the position of Figure 3 is reached because in this position the links 38 and 40 are more nearly aligned and the couple associated with the spring forces on these links tends to cause binding of the arm 32 in slots 22e and 20c in amount sufficient to overcome the translational forces exerted thereon.

As shown in Figure 3, the plate 20 has a pair of arcuate slots 20b to receive the pins 28a and 30a carrying rollers 28 and 30 from the arms 34 and 36. Pin 28a is seen in full view in Figure 6. The plate 20 also has a substantially rectangular opening 20d which registers with the similar opening 22g in plate 22 to define an aperture through which the leaving portion of the film, I, Figure 1, passes.

When the mechanism of the present invention is used, the cover 18 is folded back as shown in Figure 2 and the film container placed on the lower part 12. The cover of the container 16 is then folded back to expose the film. At this time the issuing portion I of the film coil C is held in spaced relation with the inner periphery of the coil by suitable means, such as the slot 16a which holds the film snugly when the film is inserted therein. The handle 42 is then shifted to the position "unlocked" as indicated in Figure 1 and the top 18 closed over the film and container. The roller 30 then passes between the issuing portion I of the film and the inner periphery of the film coil and the other rollers pass into the inner periphery of the film coil.

When the cover is thus folded over to the operating position, the handle 42 is shifted to the "locked" position shown in Figure 1. This expands the rollers to engage the inner periphery of the film coil and guide the film coil in its subsequent movements. Thereafter the issuing portion I of the film is withdrawn from the slot 16a or otherwise released from its positioning means to place the unit in condition for use as shown in Figure 1.

In the foregoing specification and the appended claims I have used the word "roller" to identify the parts 26, 28, and 30. While these parts have been shown as rollers and preferably are rollers, it will, of course, be understood that film guiding posts or other non-movable members may be used and that machines so constructed are within the scope of the appended claims.

While I have shown and described a specific embodiment of my invention, it will of course be understood that I intend by the appended claims to cover all variations and alternative constructions falling within the scope of the appended claims.

What I claim as new and desire to secure by Letters Patent of the United States is:

1. In an endless film reel the improvement comprising a first part defining a support for an endless film coil and a second part adapted to be received on the first part, the second part comprising a plate carrying a pair of substantially parallel rockable arms with depending film guide members on their corresponding ends, and an intermediate arm generally parallel with the first arms and carrying a depending film release member at the end corresponding to said ends of the rockable arms, the plate having an arcuate slot and a relatively straight slot, the film release member having parts extending within the straight slot to guide the intermediate arm, a member on the intermediate arm between the ends thereof and extending through said arcuate slot to define an operating handle on the opposite side of said plate, links connecting the free end of the intermediate arm with the free ends of the rockable arms, respectively, and spring means operable to urge the first arms to expanded positions.

2. In an endless film reel a first part defining a support for an endless film coil and a second part adapted for mating relation with the first part, said second part comprising a plate carrying a pair of substantially parallel rockable arms, each of said rockable arms being pivoted to said plate at a single point and being provided at one end thereof with a film guide member extending therefrom at right angles thereto, a third arm mounted on said plate between said pair of arms, a third film guide member mounted on said intermediate arm at right angles thereto, means movably securing said intermediate arm to said plate comprising a pair of slots in said plate and a pair of follower elements mounted on said intermediate arm and received respectively within said slots, links connecting said intermediate arm with the free ends of said pair of arms, spring means operable to urge said pair of arms apart, and an operating handle for moving said three arms relative to one another against the force of said spring means, one of said slots being arcuately shaped for releasably securing said arms in a position wherein said film guide members are separated by less than their maximum available separation.

3. Apparatus according to claim 2 wherein the film guide members are of unequal sizes and wherein one of said film guide members is formed generally in the shape of a truncated cone.

WILLIAM C. EDDY.

REFERENCES CITED

The following references are of record in the file of this patent:

UNITED STATES PATENTS

| Number | Name | Date |
| --- | --- | --- |
| 2,290,447 | Price | July 21, 1942 |

FOREIGN PATENTS

| Number | Country | Date |
| --- | --- | --- |
| 811,452 | France | Jan 18, 1937 |
| 824,383 | France | Nov. 10, 1937 |